United States Patent [19]
Hammond et al.

[11] Patent Number: 6,052,801
[45] Date of Patent: *Apr. 18, 2000

[54] METHOD AND APPARATUS FOR PROVIDING BREAKPOINTS ON A SELECTABLE ADDRESS RANGE

[75] Inventors: Gary N. Hammond, Campbell; Donald Alpert, Santa Clara, both of Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/438,474

[22] Filed: May 10, 1995

[51] Int. Cl.$^7$ .............................. G06F 11/30; G06F 12/00
[52] U.S. Cl. ................................................................ 714/38
[58] Field of Search ................................. 714/48, 38, 30, 714/47, 53; 395/427, 421.01

[56] References Cited

U.S. PATENT DOCUMENTS

| | | | |
|---|---|---|---|
| 4,176,394 | 11/1979 | Kaminski et al. | 364/200 |
| 4,179,734 | 12/1979 | O'Leary | 364/200 |
| 4,279,016 | 7/1981 | Leininger et al. | 364/200 |
| 4,306,287 | 12/1981 | Huang | 364/200 |
| 4,403,284 | 9/1983 | Sacarisen et al. | 364/200 |
| 4,409,654 | 10/1983 | Wada et al. | 364/200 |
| 4,488,227 | 12/1984 | Miu et al. | 364/200 |
| 4,598,364 | 7/1986 | Gum et al. | 364/300 |
| 4,709,324 | 11/1987 | Kloker | 364/200 |
| 4,725,947 | 2/1988 | Shonai et al. | 364/200 |
| 4,755,997 | 7/1988 | Takahashi | 371/19 |
| 4,783,731 | 11/1988 | Miyazaki et al. | 364/200 |
| 4,924,382 | 5/1990 | Shouda | 364/200 |
| 5,095,426 | 3/1992 | Senta | 395/375 |
| 5,197,138 | 3/1993 | Hobbs et al. | 395/375 |
| 5,237,666 | 8/1993 | Suzuki et al. | 395/375 |
| 5,249,278 | 9/1993 | Krauskopf | 395/400 |
| 5,265,213 | 11/1993 | Weiser et al. | 395/375 |
| 5,319,763 | 6/1994 | Ho et al. | 395/425 |
| 5,341,500 | 8/1994 | Moyer | 395/725 |
| 5,361,348 | 11/1994 | Nakamoto | 395/575 |
| 5,367,550 | 11/1994 | Ishida | 377/39 |
| 5,371,894 | 12/1994 | DiBrino | 395/800 |
| 5,379,301 | 1/1995 | Sato et al. | 371/19 |
| 5,386,519 | 1/1995 | Nakamura et al. | 395/375 |
| 5,448,705 | 9/1995 | Nguyen et al. | 395/375 |
| 5,493,664 | 2/1996 | Doi | 395/427 |
| 5,530,804 | 6/1996 | Edgington et al. | 395/183.06 |
| 5,533,192 | 7/1996 | Hawley et al. | 395/183.04 |
| 5,564,028 | 10/1996 | Swoboda et al. | 395/375 |

OTHER PUBLICATIONS

*Pentium™ Processor User's Manual*, vol. 3: *Architecture and Programming Manual*, Intel Corporation 1994, pp. 14-1-14-27 and 17-1-17-9.

80960KB Programmer's Reference Manual, Intel Corporation 1988, pp. 10-1-10-8.

*Primary Examiner*—Hoa T. Nguyen
*Attorney, Agent, or Firm*—Blakely, Sokoloff, Taylor & Zafman LLP

[57] ABSTRACT

A method and apparatus for providing breakpoints on a selectable address range. The apparatus generally includes a processor including a first storage area, a second storage area, a circuit and an execution unit. The first storage area has stored therein a first address, while the second storage area has stored therein a mask. The first address and the mask define an address range. In response to receiving a second address, the circuit accesses the first address stored in the first storage area and the mask stored in the second storage area. The circuit transmits a signal to cause a debug event if the second address is within the address range defined by the first address and the mask.

22 Claims, 6 Drawing Sheets

METHOD AND APPARATUS FOR PROVIDING BREAKPOINTS ON A SELECTABLE ADDRESS RANGE

BACKGROUND OF THE INVENTION

1. Field of the Invention

The invention relates to the field of computer systems. More specifically, the invention relates to software debugging.

2. Background Information

Software debugging is the detecting, locating, and correcting of logical and/or syntactical errors in a computer program. Debug hardware is often included in a processor for use by a software debug program. Typically, the debug program uses the debug hardware to allow the programmer to examine data and check conditions during the execution of another computer program. Thus, the debugging features of a processor provide programmers with valuable tools for looking at the dynamic state of the processor.

A prior art method and apparatus for aiding in software debugging is included in the Intel® Pentium™ microprocessor manufactured by Intel Corporation of Santa Clara, Calif. The Pentium microprocessor includes 4 address breakpoint registers, each capable of storing the linear address of a breakpoint (i.e., the address of a memory or I/O location). In addition, the Pentium processor also includes indications for each breakpoint register specifying the type of breakpoint address stored therein: 1) break on instruction execution only; 2) break on data writes only; 3) break on I/O reads or writes; and 4) break on data reads or writes but not on instruction fetches. In addition, the Pentium processor includes circuitry for calling a debug software routine (referred to herein as the "debug handler") when one or more of these breakpointed locations is accessed and the appropriate corresponding indications are properly set.

For example, the programmer may store in a breakpoint register the address of a particular instruction and identify that address as a break on instruction execution only breakpoint address. When the processor accesses the instruction corresponding to the breakpoint address, a breakpoint event is reported. It is worthwhile to note that breakpoint comparisons are performed before physical address translation occurs. In addition, it is worthwhile to note that the term "event" is used herein to refer to any action or occurrence to which a computer system might respond (e.g., hardware interrupts, software interrupts, exceptions, faults, traps, aborts, machine checks, debug events).

Upon receiving the breakpoint event, the processor's event handling mechanism causes the processor to interrupt execution of the current process, store the interrupted process' execution environment (i.e., the information necessary to resume execution of the interrupted process), and invoke the debug handler. The debug handler is a portion of the debug program that allows the programmer to perform a variety of debugging techniques. When the programmer is finished, the programmer can instruct the debug handler to cause the processor to resume the interrupted process using the process' previously stored execution environment. For a further description of the Pentium processor see: *Pentium Processor's Users Manual—Volume 3: Architecture and Programming Manual*, 1994, available from Intel Corporation of Santa Clara, Calif.

The Pentium processor also includes a 2-bit range indication for each breakpoint register that specifies the address range of the breakpointed location. An address range of 1, 2, or 4 bytes may be specified. For example, if the 4 byte range is selected, a breakpoint fault will occur if any one of the four bytes starting at the breakpoint address are accessed. Since the selectable address ranges are 1, 2, or 4 bytes, the lower 2-bits of the breakpoint address are not used. The circuitry on the Pentium processor for determining if an address falls within this address range includes: 1) comparison logic for comparing the upper 30-bits of the breakpoint address with the upper 30-bits of the address to be matched; and 2) combinational logic (also termed as "random logic") to determine if the lower 2-bits of the address falls within the address range identified by the 2-bit range indication.

A limitation of the Pentium processor is the size of the breakpoint location which may be specified as a breakpoint (i.e., the largest possible size is 4 bytes). The size of the breakpoint locations in the Pentium processor was limited to a maximum of 4 bytes because the combinational logic used to define the breakpoint address ranges requires a significant amount of die space. Since the size of breakpoint locations in the Pentium processor is limited to a maximum of 4 bytes, the largest possible area of coverage using all four breakpoint registers is 16 bytes. However, research shows that it is desirable to be able to define larger address ranges. For example, it is sometimes desirable to cause a debug event upon an access to a common data structure or to a section of code. However, it is often the case that data structures and sections of code are larger than 16 bytes.

SUMMARY

An apparatus for providing breakpoints on a selectable address range is described. The apparatus generally includes a processor including a first storage area, a second storage area, a circuit and an execution unit. The first storage area has stored therein a first address, while the second storage area has stored therein a mask. The first address and the mask define an address range. In response to receiving a second address, the circuit accesses the first address stored in the first storage area and the mask stored in the second storage area. The circuit transmits a signal to cause a debug event if the second address is within the address range defined by the first address and the mask.

BRIEF DESCRIPTION OF THE DRAWINGS

The invention may best be understood by referring to the following description and accompanying drawings which illustrate the invention. In the drawings.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to unnecessarily obscure the invention. It is worthwhile to note that addresses are represented in hexadecimal form unless otherwise specified.

This application describes an invention for providing breakpoints on a selectable address range of any size. Thus, the invention allows a programmer to define an address range which covers an entire data structure(s) and/or section(s) of code. In this manner, the invention provides for greater debugging capabilities over prior art processor that can define breakpoint locations of only a 1, 2, or 4 byte size.

One Embodiment of the Invention

Figure 1:
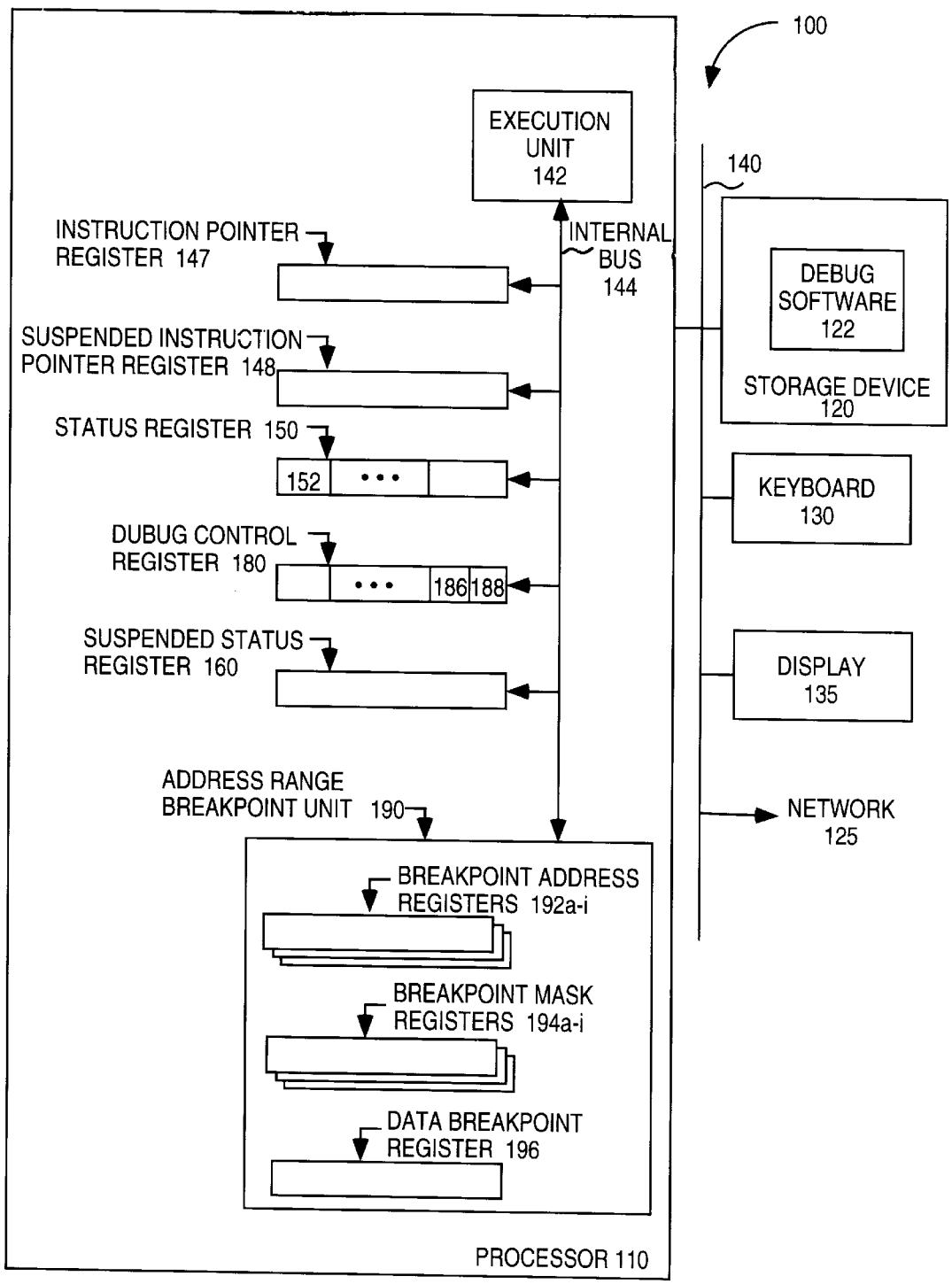
FIG. 1 shows a block diagram illustrating an exemplary computer system 100 incorporating the teachings of the invention.

FIG. 1 shows a block diagram illustrating an exemplary computer system 100 incorporating the teachings of the invention. The exemplary computer system includes a processor 110, a storage device 120, a network 125, and a bus 140. Processor 110 is coupled to storage device 120 and network 125 by bus 140. In addition, a number of user input/output devices, such as a keyboard 130 and a display 135, are also coupled to bus 140. Processor 110 represents a central processing unit of any type of architecture, including a CISC or RISC type architecture. In addition, processor 110 could be implemented on one or more chips. Storage device 120 represents one or more mechanisms for storing data. For example, storage device 120 may include read only memory (ROM), random access memory (RAM), magnetic disk storage mediums, optical storage mediums, and/or flash memory devices. While this embodiment is described in relation to a single processor computer system, the invention could be implemented in a multi-processor computer system. In addition, while this embodiment is described in relation to a 64-bit computer system, the invention is not limited to a 64-bit computer system.

FIG. 1 also illustrates that storage device 120 has stored therein debug software 122 for execution on processor 110 to provide for the debugging of other software. Of course, storage device 120 preferably contains additional software which is not necessary to understanding the invention.

FIG. 1 additionally illustrates that processor 110 includes an execution unit 142, instruction pointer register 147, suspended instruction pointer register 148, status register 150, suspended status register 160, debug control register 180, address range breakpoint unit 190, and internal bus 144. Of course, processor 110 contains additional circuitry which is not necessary to understanding the invention.

Internal bus 144 couples the elements of processor 110 together. Execution unit 142 is used for executing instructions. Instruction pointer register 147 is used for storing an address of an instruction currently being executed by execution unit 142. Status register 150 is used for storing status information concerning the process currently executing on execution unit 142. The contents of instruction pointer register 147 and status register 150 make up the execution of environment of the process currently executing on processor 110. Suspended instruction pointer register 148 and suspended status register 160 are used for temporarily storing the execution environment of a process whose execution is suspended in response to an event. However, alternative embodiments could use any number of techniques for temporarily storing the execution of environment of a suspended process. For example, see Shanley, Tom and Anderson, Don, *ISA System Configuration*, MindShare, Inc. (1993).

Status register 150 includes an enable bit 152 for enabling address range breakpoint unit 190. When enable bit 152 indicates an enable state, address range breakpoint unit 190 is enabled. In contrast, when enable bit 152 indicates a disable state, address range breakpoint unit 190 is disabled. While one embodiment is described in which bits in registers on processor 110 are used for storing indications (e.g., enable bit 152), alternative embodiments could use any number of techniques. For example, alternative embodiments could store these indications off chip (e.g., in storage device 120) and/or could use multiple bits for each indication.

Address range breakpoint unit 190 is used for allowing address breakpoints on a selectable range of addresses. Address range breakpoint unit 190 includes breakpoint address registers 192a–i, breakpoint mask registers 194a–i, and a data breakpoint register 196. Breakpoint address registers 192a–i are each used for storing a breakpoint address. In one embodiment, there are four breakpoint address registers, each of which has a corresponding breakpoint mask register. Breakpoint mask registers 194a–i are each used for storing a mask. Each breakpoint address and its corresponding breakpoint mask define an address range. Address range breakpoint unit 190 also includes circuitry coupled to breakpoint address registers 192a–i, breakpoint mask register 194a–i, and data breakpoint register 196. In response to receiving designated addresses from internal bus 144, this circuitry determines whether these addresses are within the address ranges identified by the contents of address register 192a–i and breakpoint mask register 194a–i. While this embodiment is described in relation to using addresses and masks to define address ranges, alternative embodiments could use any number of techniques. For example, an alternative embodiment could store a starting address and an ending address to define an address range.

Debug control register 180 is used for storing control information for address range breakpoint unit 190. In one embodiment, debug control register 180 contains a type indication corresponding to each address range identified by breakpoint address registers 192a–i and breakpoint mask registers 194a–i. This type indication is used for specifying whether its corresponding address range is an instruction address breakpoint range or a data address breakpoint range. In one embodiment, the type indication comprises several bits and can further identify the following type of breakpoints: 1) an instruction address breakpoint; 2) a data write address breakpoint; 3) an I/O access breakpoint; or 3) a data read or write address breakpoint. To ease the understanding of the invention, debug control register 180 is shown containing only type bits 186 which corresponds to breakpoint address register 192a and breakpoint mask register 194a.

Debug control register 180 also contains an enable indication for each address range identified by the contents of breakpoint address registers 192a–i and breakpoint mask registers 194a–i. This enable indication specifies whether its corresponding address range is currently enabled. To ease understanding of the invention, debug control register 180 is shown containing a single enable bit 188 corresponding to breakpoint address register 192a and breakpoint mask register 194a.

Figure 2:
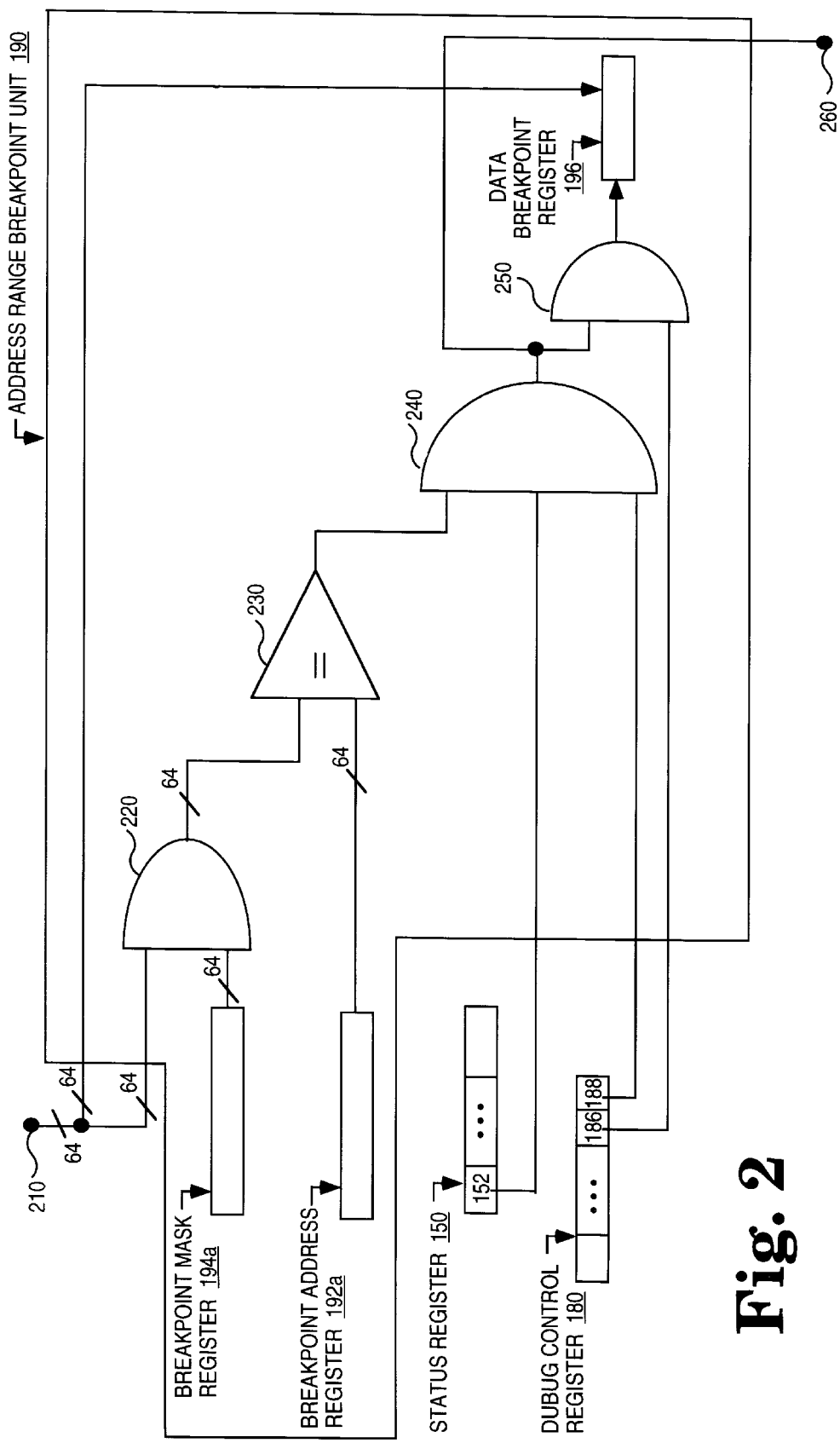
FIG. 2 illustrates a block diagram of exemplary circuitry for implementing address range breakpoint unit 190.

FIG. 2 illustrates a block diagram of exemplary circuitry for implementing address range breakpoint unit 190 according to one embodiment of the present invention. FIG. 2 shows a node 210 representing 64 address lines at which 64-bit addresses are received. These addresses can be received from execution unit 142, instruction pointer register 147, a memory management unit, or any other unit which generates and/or stores addresses. The addresses asserted at node 210 could include instruction addresses, I/O addresses, data addresses, etc. The 64 address lines represented by node 210 are each coupled to a corresponding one of 64 AND gates represented by AND gate 220. The other input of these AND gates is coupled to receive the breakpoint mask stored in breakpoint mask register 194a, such that corresponding bits from the current address asserted at node 210 and the breakpoint mask stored in breakpoint mask register 194a are logically ANDed together. In this manner, the AND gates represented by AND gate 220 are used for "masking" the address asserted at node 210 with the breakpoint mask stored in breakpoint mask register 194a. The outputs of the AND gates represented by AND gate 220 are coupled to inputs of a comparator 230.

The other inputs of comparator 230 are coupled to receive the breakpoint address stored in breakpoint address register 192a. If the result of ANDing the breakpoint mask stored in breakpoint mask register 194a with the current address asserted at node 210 is equivalent to the breakpoint address stored in breakpoint address register 192a, then the current address asserted at node 210 is within the address range defined by the contents of breakpoint address register 192a and breakpoint mask register 194a.

For example, if the desired address range is from "00 00 00 00 00 FF 00 0F" to "00 00 00 00 00 FF 00 00", the mask stored in breakpoint mask register 194a would be "FF FF FF FF FF FF FF F0" and the breakpoint address would be "00 00 00 00 00 FF 00 00". Thus, if the address received at node 210 is "00 00 00 00 00 FF 00 05", the result of masking this address with the breakpoint mask is "00 00 00 00 00 FF 00 00". Since this result is equivalent to the breakpoint address stored in breakpoint address register 192a, this address is within the range defined by the breakpoint address and the breakpoint mask and comparator 230 indicates as such—i.e., an address breakpoint range hit. In contrast, if the above address range is used but the address received at node 210 is "00 00 00 00 00 FF 00 FF", the result of masking this address is "00 00 00 00 00 FF 00 F0". Since this result is not equivalent to the breakpoint address stored in breakpoint address register 192a, this address is not within the address range and comparator 230 indicates as such—i.e., an address breakpoint range miss.

In this manner, this embodiment is capable of identifying an address range whose size is limited only by the size of the breakpoint address registers and breakpoint mask registers. Since the described embodiment uses 64 addressing bits, the entire addressing range of $2^{64}$ may be selected. This allows a programmer to mark entire data structures and/or code sections so that any access to them will cause an event.

FIG. 2 also shows AND gate 240 coupled to receive the output of comparator 230, enable bit 152 from status register 150, and enable bit 188 from debug control register 180. Thus, if comparator 230 indicates the address asserted at node 210 is within the address range, enable bit 152 indicates address range breakpoint unit 190 is enabled, and enable bit 188 indicates the address range is enabled, the output of AND gate 240 is high. The output of AND gate 240 is transmitted to output node 260 to report the address received at node 210 is inside the breakpoint address range.

The output of AND gate 240 is also coupled to the input of AND gate 250. The other input of AND gate 250 is coupled to receive type bits 186. Thus, if an address range breakpoint hit is detected and type bit 186 indicates that address range is a data address range, the output of AND gate 250 is high. The output of AND gate 250 is coupled to data breakpoint register 196 such that data breakpoint register 196 stores the address received at node 210 if the output of AND gate 250 is high. Thus, the contents of data breakpoint register 196 indicate the specific address in the address range which was accessed. Since the instruction pointer stored in instruction pointer register 147 is copied into the suspended instruction pointer register 148 upon the occurrence of an event, and since the reporting of an address range breakpoint hit causes a breakpoint event, the specific address in the address range is stored in suspended instruction pointer register 148 by processor 110's event handling mechanism if the address range is an instruction address range.

While one embodiment of address breakpoint unit 190 has been described in relation to FIG. 2, alternative embodiments could use any number of different circuitry configurations to implement the invention. For example, the register 192a and comparator 230 could each be implemented using a content addressable memory (a memory cell with a comparator built in). As another example, enable bit 152 could be used as an enable to comparator 230, rather than as an input to AND gate 240. As another example, comparator 230 could be made 65-bits wide and enable bit 152 could be the $65^{th}$ input that is compared with logic 1. As another example, the invention could be implemented in software.

Figure 3:
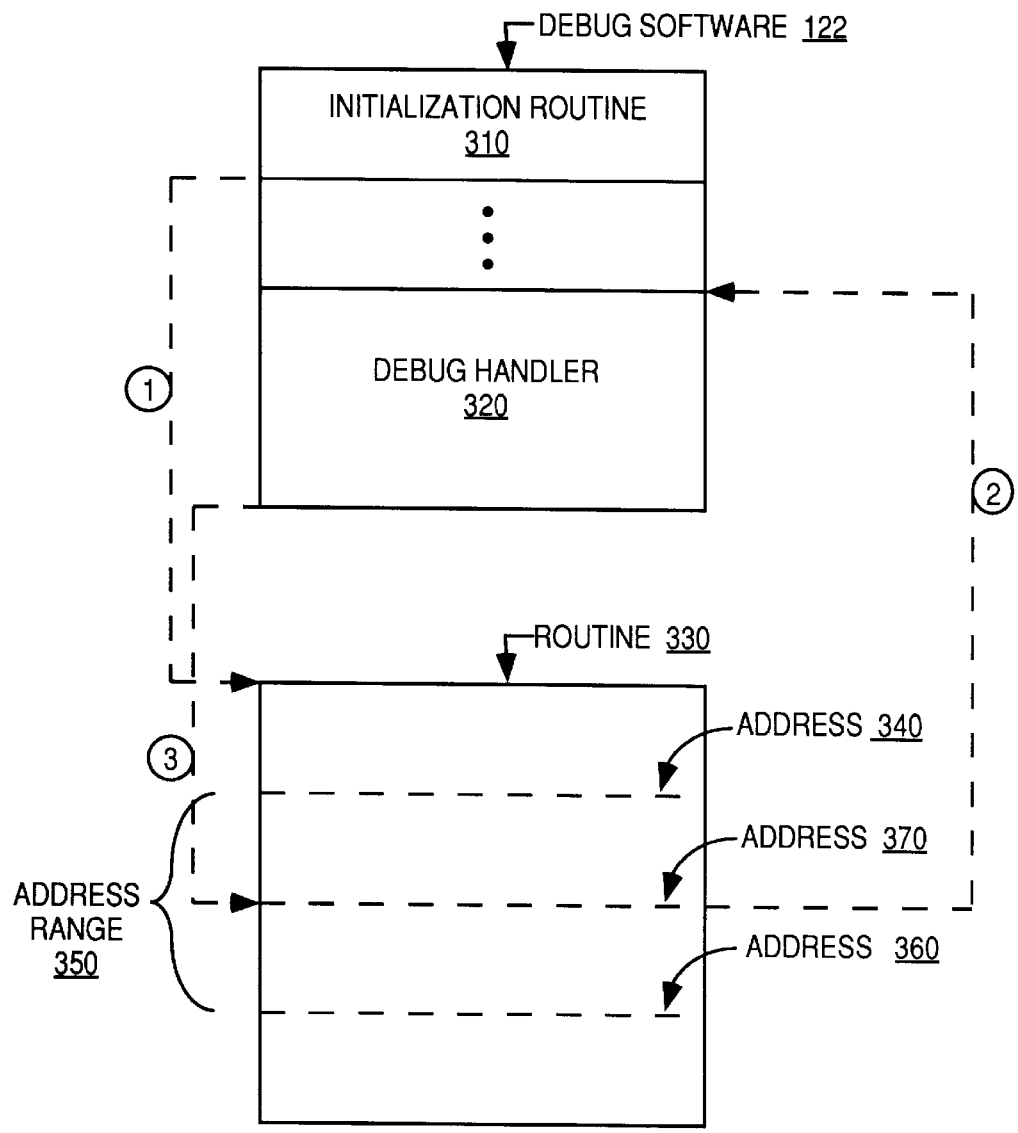
FIG. 3 illustrates the operation of one embodiment of the present invention.

FIG. 3 illustrates the operation of one embodiment of the present invention. FIG. 3 shows debug software 122 including an initialization routine 310 and a debug handler 320. In addition, FIG. 3 shows a routine 330. Assuming it is desired to perform software debugging on routine 330, initialization routine 310 is executed.

Figure 4:
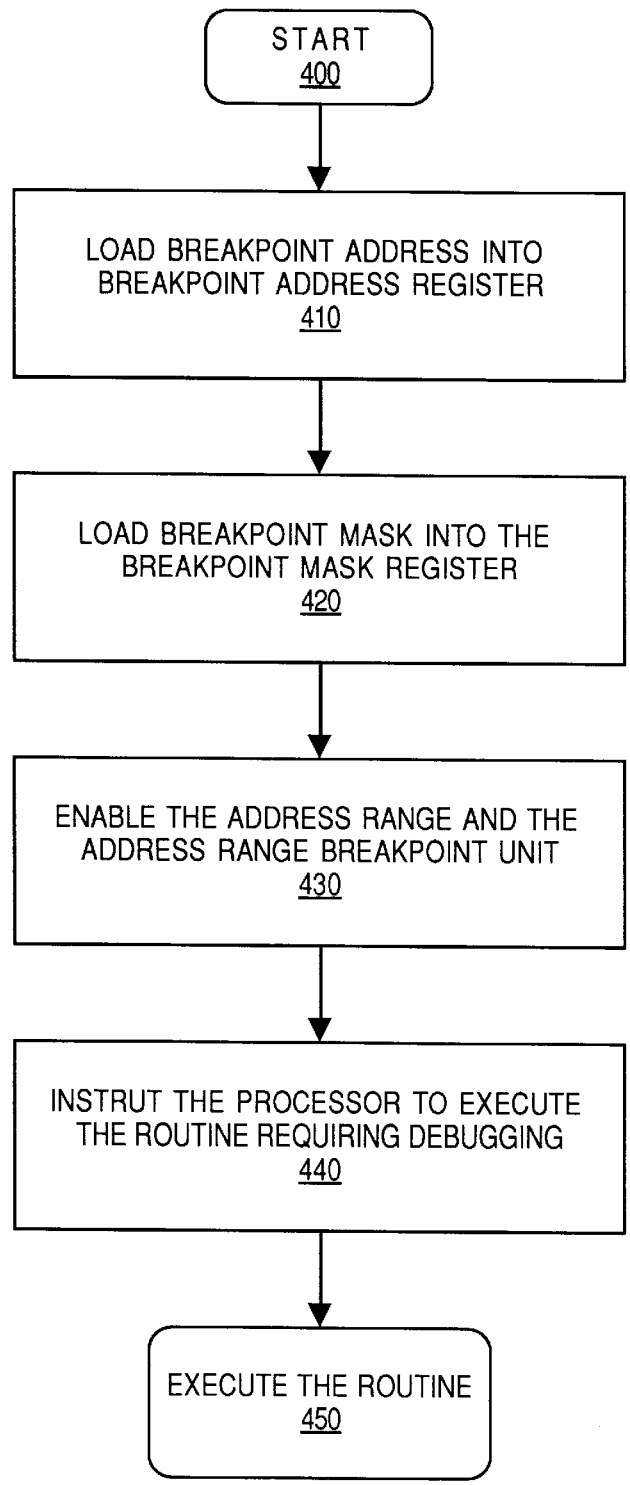
FIG. 4 illustrates a flow diagram of the operation of initialization routine 310 according to one embodiment of the invention.

FIG. 4 illustrates a flow diagram of the operation of initialization routine 310 according to one embodiment of the invention. The flow diagram starts at step 400 from which flow passes to step 410.

At step 410, the breakpoint address is loaded into a breakpoint address register and flow passes to step 420. To provide an example, it is assumed that address 340 from FIG. 3 is loaded into breakpoint address register 192a.

As shown in step 420, the breakpoint mask is loaded into the previous breakpoint address register's corresponding breakpoint mask register aid flow passes to step 430. In the present example, a breakpoint mask is loaded into breakpoint mask register 194a such that address range 350 is defined starting at address 340 and ending at address 360.

At step 430, the address range and the address range breakpoint unit are enabled. In the present example, initialization routine 310 alters the state of enable bit 188 to enable address range 350 (i.e., enable the address range defined by the contents of breakpoint address register 192a and breakpoint mask register 194a). In addition, initialization routine 310 alters the state of enable bit 152 to enable address range breakpoint unit 190.

As shown in step 440, the processor is instructed to execute the routine requiring debugging and flow passes to step 450. In the present example, initialization routine 310 causes the processor to begin execution of routine 330 as shown by line 1 in FIG. 3.

The flow diagram ends at step 450 in which the processor begins execution of the routine.

During the execution of routine 330, both instruction addresses and data addresses will be generated. For each of these addresses, it must be determined whether that address is in the address range previously stored by initialization routine 310.

In one embodiment, the detection and servicing of instruction address breakpoints occurs at a different time that the detection and servicing of data address breakpoints. Instruction address breakpoints are detected and reported prior to instruction execution (commonly referred to as "faults"). However, data address breakpoints are detected during instruction execution and are reported following execution of the instruction (commonly referred to as "traps"). A distinction is made between instruction addresses and data addresses because it is desirable to have the debug software gain control prior to the execution of an instruction whose corresponding address is a breakpointed address. For example, if an instruction is located at first address and a jump is taken to that first address, it is desirable to have the breakpoint event occur prior to the execution of that instruction.

Figure 5:
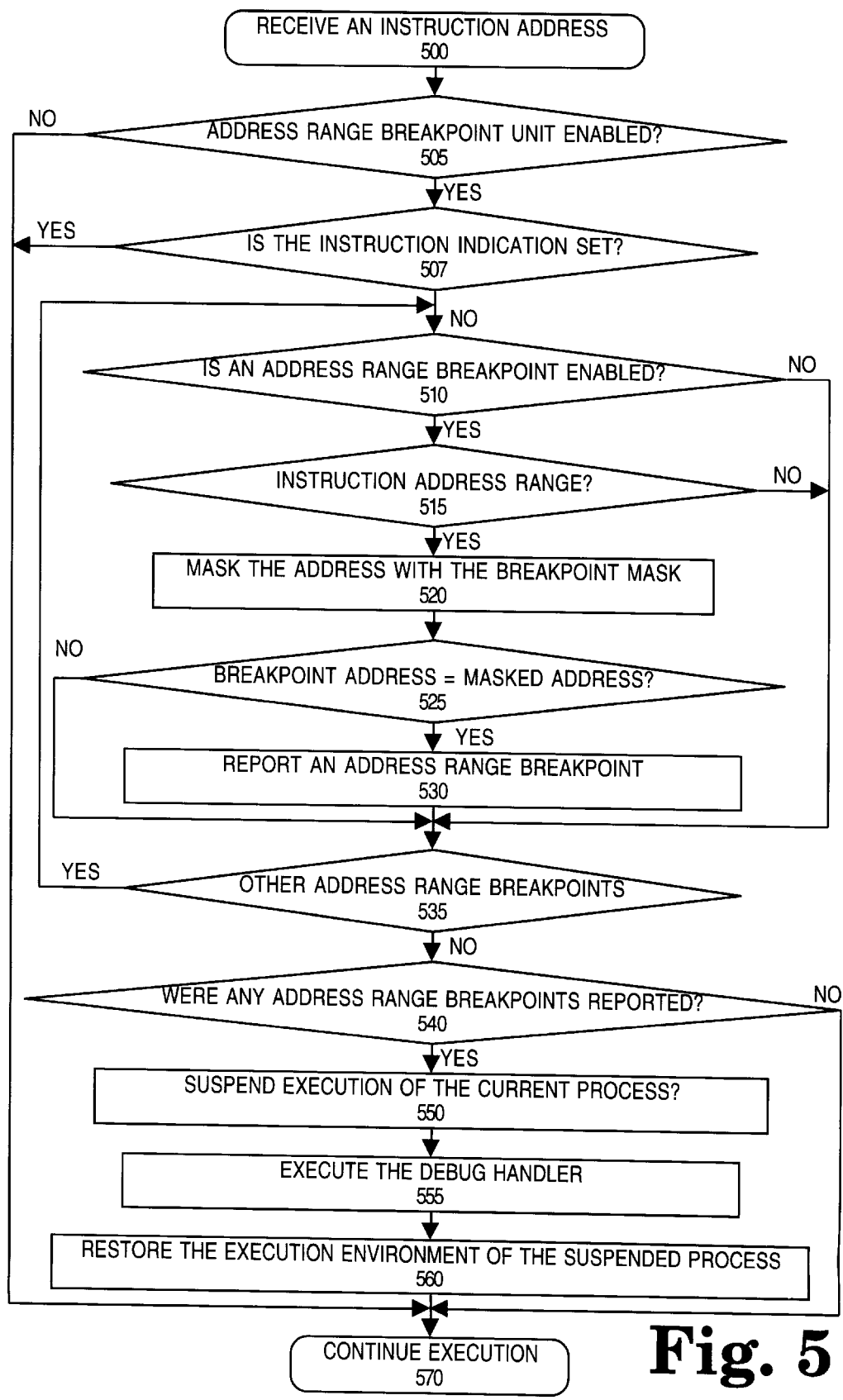
FIG. 5 shows a flow diagram illustrating the operation of processor 110 in response to an instruction address according to one embodiment of the present invention.

FIG. 5 shows a flow diagram illustrating the operation of processor 110 in response to an instruction address breakpoint according to one embodiment of the present invention. As shown in step 500, an instruction address is received. In the present example, it is assumed that this address was generated during the execution of routine 330 and that this address is address 370 from FIG. 3. In addition, it is assumed that address 370 identifies the next instruction to be executed.

As shown in step 505, it is determined whether the address range breakpoint unit is enabled. If the address range breakpoint unit is enabled, flow passes to step 510. Otherwise, flow passes to step 570 where the flow diagram ends. The instruction indication can be implemented as a bit in a register on processor 100. In the present example, the state of enable bit 152 was altered in step 430 to enable address range breakpoint unit 190. Thus, flow passes to step 510.

At step 507, it is determined whether the instruction indication indicates an instruction address breakpoint event has already occurred for the instruction identified by the instruction address received in step 500. If the instruction indication indicates an instruction address breakpoint event has not occurred for the instruction identified by the instruction address received in step 500, flow passes to step 510. Otherwise, flow passes to step 570. Since instruction addresses are detected and serviced prior to the corresponding instruction's execution, an instruction indication is set by the debug handler upon servicing an instruction address breakpoint event. This instruction indication is set to indicate an instruction address breakpoint event was just serviced. In so doing, when the execution of the interrupted process (e.g., routine 330) is resumed, the instruction indication indicates an instruction address breakpoint event has already been taken on the next instruction to be executed. As a result, another instruction address breakpoint event does not occur for the same instruction. This instruction indication is clear each time an instruction is executed, thereby allowing an instruction address breakpoint to occur on the following instruction. In step 507, this instruction indication is inspected to determine if an instruction address breakpoint event has already been taken on the instruction identified by the instruction address received in step 500.

At step 510, it is determined whether an address range breakpoint is enabled. If an address range breakpoint is enabled, flow passes to step 515. Otherwise flow passes to step 535. In the present example, the state of enable bit 188 was altered in step 430 to enable the address range stored in breakpoint address register 192a and breakpoint mask register 194a. Thus, flow passes to step 515.

At step 515, it is determined whether the enabled address range is an instruction address range. If the address range is not an instruction address range, flow passes to step 535. Otherwise, flow passes to step 520. In the present example, the states of type bits 186 are inspected. If the address range is an instruction address range, initialization routine 310 would have altered the states of type bits 186 to indicate it was an instruction address range.

As shown in step 520, the address received in step 500 is masked with the breakpoint mask and flow passes to step 525. In the previously described embodiment, the address is masked with the breakpoint mask by performing a logical AND operation.

At step 525, it is determined whether the breakpoint address is equivalent to the masked address. If the breakpoint address is not equivalent to the masked address, flow passes to step 535. Otherwise, flow passes to step 530. By performing steps 520 and 525, it is determined whether the address is within the address range.

At step 530, an address range breakpoint hit is reported and flow passes to step 535. In one embodiment, an event status register is included on processor 110. The processor stores a number of bits in this event status register which indicate which address range breakpoints matched—e.g., when an address range breakpoint hit occurs, the state of these bits is altered to indicate that address range breakpoint matched.

As shown in step 535, it is determined whether other address range breakpoints require processing. If other address range breakpoints require processing, flow passes back to step 510. Otherwise, flow passes to step 540. In the described embodiment, the next breakpoint address register and its corresponding breakpoint mask register would be processed. Alternative embodiments could be implemented to process the multiple breakpoint address ranges in any number of ways. For example, an alternative embodiment could process all of the address range ranges in parallel.

At step 540, it is determined whether any address range breakpoints were reported. If any address range breakpoints were reported, flow passes to step 550. Otherwise, flow passes to step 570. In the described embodiment, the bits in the event status register are inspected to see if any address range breakpoints matched. If one or more breakpoints matched, flow passes to step 550.

As shown in step 550, the processor suspends execution of the current process and stores its execution environment. From step 550, flow passes to step 555. In the present example, processor 110 stores the current process' execution environment by copying the contents of instruction pointer register 147 and status register 150 into suspended instruction pointer register 148 and suspended status register 160, respectively. In so doing, the specific address within the address range which was accessed is stored in suspended instruction pointer register 148.

As shown in step 555, the debug handler is executed. This is shown by line 2 of FIG. 3. Upon completion of debug handler 320, flow passes to step 560. In one embodiment, debug handler 320 is a generic handler which services multiple events, including address range breakpoint events. Debug handler 320 knows which event has occurred by inspecting the event status register. If an address range breakpoint event has occurred, the event status register will indicate one or more address range breakpoints matched. The debug handler 320 additionally sets the instruction indication to indicate an instruction address breakpoint event has already occurred for the instruction identified by the instruction address received in step 600. Upon completion of debug handler 320, flow passes to step 560. Typically, the last instruction of a handler to be executed is one which indicates as such to the processor.

At step 560, the processor restores the execution environment of the suspended process. From step 560, flow passes to step 570. In the present example, processor 110 restores the suspended process' execution environment by copying the contents of suspended instruction pointer register 148 and suspended status register 160 into instruction pointer register 147 and status register 150, respectively.

At step 570, the flow diagram ends with the processor continuing execution. In the present example, the processor resumes execution of routine 330 at address 370 as shown by line 3 in FIG. 3.

Figure 6:
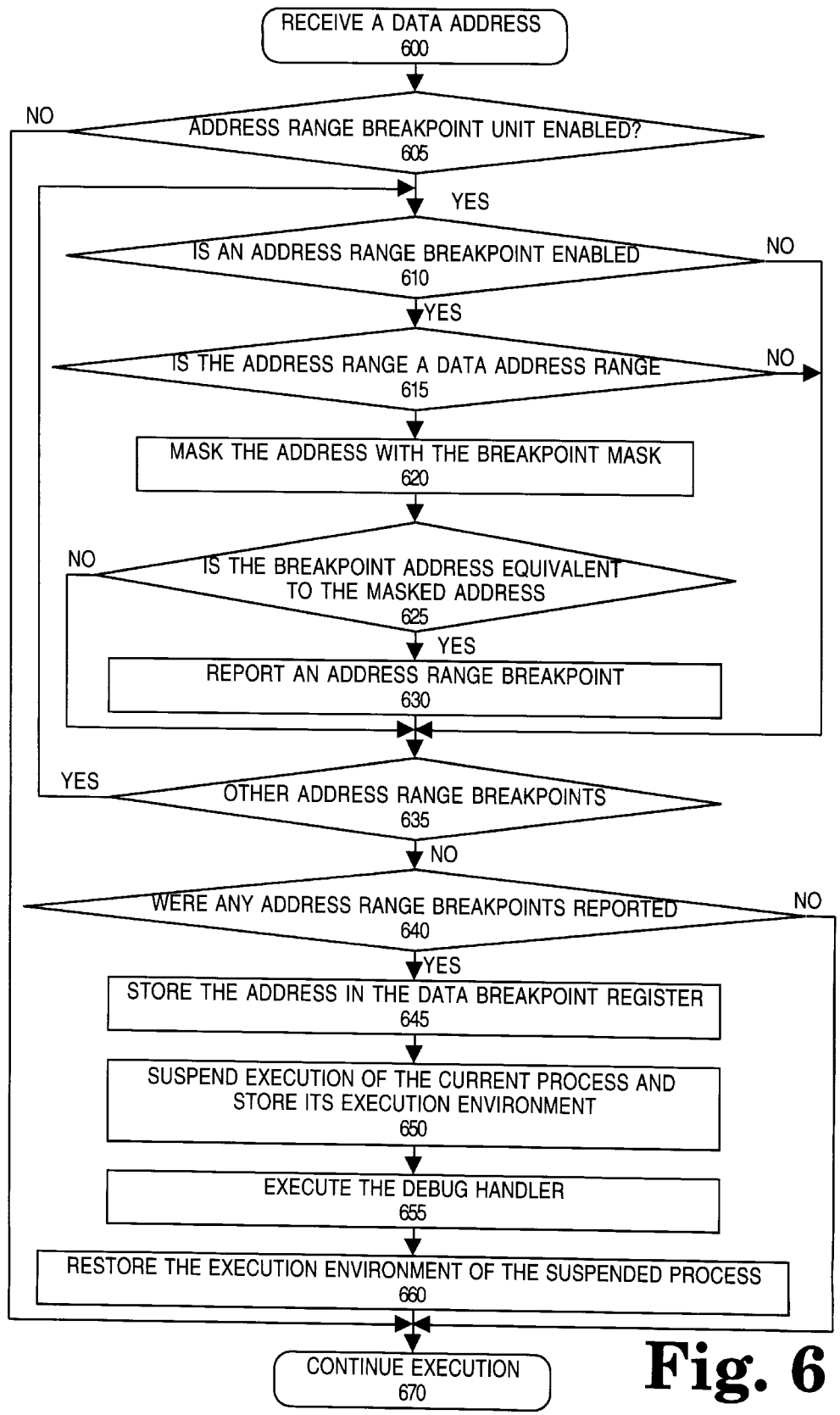
FIG. 6 shows a flow diagram illustrating the operation of processor 110 in response to a data address according to one embodiment of the present invention.

FIG. 6 shows a flow diagram illustrating the operation of processor 110 in response to a data address breakpoint according to one embodiment of the present invention. As shown in step 600, a data address is received. In the present example, it is assumed that this address was generated during the execution of routine 330 and that this address is address 370 from FIG. 3. In addition, it is assumed that address 370 identifies data.

As shown in step 605, it is determined whether the address range breakpoint unit is enabled. If the address range breakpoint unit is enabled, flow passes to step 610. Otherwise, flow passes to step 670 where the flow diagram ends. In the present example, the state of enable bit 152 was altered in step 430 to enable address range breakpoint unit 190. Thus, flow passes to step 610.

At step 610, it is determined whether an address range breakpoint is enabled. If an address range breakpoint is enabled, flow passes to step 615. Otherwise flow passes to step 635. In the present example, the state of enable bit 188 was altered in step 430 to enable the address range stored in breakpoint address register 192a and breakpoint mask register 194a. Thus, flow passes to step 615.

At step 615, it is determined whether the enabled address range is a data address range. If the address range is not a data address range, flow passes to step 635. Otherwise, flow passes to step 620. In the present example, the states of type bits 186 are inspected. If the address range is a data address range, initialization routine 310 would have altered the states of type bits 186 to indicate it was a data address range.

As shown in step 620, the address received in step 600 is masked with the breakpoint mask and flow passes to step 625. In the previously described embodiment, the address is masked with the breakpoint mask by performing a logical AND operation.

At step 625, it is determined whether the breakpoint address is equivalent to the masked address. If the breakpoint address is not equivalent to the masked address, flow passes to step 635. Otherwise, flow passes to step 630. By performing steps 620 and 625, it is determined whether the address is within the address range.

At step 630, an address range breakpoint hit is reported and flow passes to step 635. In one embodiment, an event status register is included on processor 110. The processor stores a number of bits in this event status register which indicate which address range breakpoints matched—e.g., when an address range breakpoint hit occurs, the state of these bits is altered to indicate that address range breakpoint matched.

As shown in step 635, it is determined whether other address range breakpoints require processing. If other address range breakpoints require processing, flow passes back to step 610. Otherwise, flow passes to step 640. In the described embodiment, the next breakpoint address register and its corresponding breakpoint mask register would be processed. Alternative embodiments could be implemented to process the multiple breakpoint address ranges in any number of ways. For example, an alternative embodiment could process all of the address range ranges in parallel.

At step 640, it is determined whether any address range breakpoints were reported. If any address range breakpoints were reported, flow passes to step 645. Otherwise, flow passes to step 670. In the described embodiment, the bits in the event status register are inspected to see if any address range breakpoints matched. If one or more breakpoints matched, flow passes to step 645.

As shown in step 645, the address is stored in the data breakpoint register and flow passes to step 645. In this manner, the specific address in that data address range is stored for use by debug handler 320.

As shown in step 650, the processor suspends execution of the current process and stores its execution environment. From step 650, flow passes to step 655. In the present example, processor 110 stores the current process' execution environment by copying the contents of instruction pointer register 147 and status register 150 into suspended instruction pointer register 148 and suspended status register 160, respectively.

As shown in step 655, the debug handler is executed. Upon completion of debug handler 320, flow passes to step 660. In one embodiment, debug handler 320 is a generic handler which services multiple events, including address range breakpoint events. Debug handler 320 knows which event has occurred by inspecting the event status register. If an address range breakpoint event has occurred, the event status register will indicate one or more address range breakpoints matched. Upon completion of debug handler 320, flow passes to step 660. Typically, the last instruction of a handler to be executed is one which indicates as such to the processor.

At step 660, the processor restores the execution environment of the suspended process. From step 660, flow passes to step 670. In the present example, processor 110 restores the suspended process' execution environment by copying the contents of suspended instruction pointer register 148 and suspended status register 160 into instruction pointer register 147 and status register 150, respectively.

At step 670, the flow diagram ends with the processor continuing execution. In the present example, the processor resumes execution of routine 330.

Alternative Embodiments

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A processor comprising:
   a first storage area having stored therein a first address;
   a second storage area having stored therein a mask, said first address and said mask defining an address range;
   a data breakpoint storage area;
   a circuit receiving a second address that is a data address, said circuit coupled to said first storage area and said second storage area to receive said first address and said mask, said circuit writing said second address to said data breakpoint storage area if said second address is within said address range, said circuit having an output transmitting a signal to cause a debug event if said second address is within said address range; and
   an execution unit coupled to said output.

2. The processor of claim 1 further comprising a third storage area, coupled to said circuit, having stored therein an indication indicating whether said address range is enabled.

3. The processor of claim 2, said execution unit recognizing said debug event in response to said signal.

4. The processor of claim 1 further comprising:
a third storage area, coupled to said circuit, having stored therein an indication for indicating whether said address range is applicable to data addresses, said circuit writing said second address and transmitting said signal only if said second address is within said address range and said indication indicates said address range is applicable to data addresses.

5. A processor comprising:
a first storage area having stored therein an information defining an address range, said information capable of identifying said address range to be larger than 4 bytes;
a circuit coupled to receive a first address, said circuit coupled to said first storage area, said circuit having an output transmitting a signal to cause a debug event if said first address is within said address range;
a second storage area, coupled to said circuit, having stored therein an indication;
a data breakpoint storage area, coupled to said circuit, having stored therein said first address if said first address is inside said address range and said indication indicates said address range is a data address range; and
an execution unit coupled to said output.

6. The processor of claim 5, said first storage area including a first register having stored therein a second address and a second register having stored therein a mask, said information including said first address and said mask.

7. The processor of claim 5, said execution unit recognizing said debug event in response to said signal.

8. A processor comprising:
an address breakpoint means coupled to receive a first address generated to access data, said address breakpoint means for determining a debug breakpoint should be reported if each of a set of conditions is true, one of said set of conditions being if said first address is in an address range defined by a second address and a mask, said address breakpoint means also for storing said first address if it is determined said debug breakpoint should be reported; and
an execution unit, coupled to said address breakpoint means, for recognizing said debug breakpoint if said address breakpoint means reports said debug breakpoint.

9. The processor of claim 8, said address breakpoint means including,
a first storage area for storing said second address; and
a second storage area for storing said mask.

10. The processor of claim 8, further comprising:
a first storage area for storing an indication identifying whether debug breakpoints are to be generated for addresses that are in said address range and that are generated to access data; and
said address breakpoint means coupled to said first storage area, wherein another of said set of conditions is if said indication indicates that debug breakpoints are to be generated for addresses that are in said address range and that are generated to access data.

11. The processor of claim 8, wherein said set of conditions includes a single condition.

12. A computer system comprising:
a storage area having stored therein an initialization routine and a debug handler;
a processor coupled to said storage area including:
a first storage area having stored therein a first address;
a second storage area having stored therein a mask, said first address and said mask defining an address range, said first address and said mask having been stored by said processor executing said initialization routine;
a third storage area
a circuit receiving a second address that is a data address, said circuit coupled to said first storage area and said second storage area to receive said first address and said mask, said circuit writing said second address to said third storage area if said second address is within said address range, said circuit having an output transmitting a signal to cause a debug event if said second address is within said address range; and
an execution unit coupled to said output executing said debug handler in response to said signal to provide information for debugging.

13. The computer system of claim 12 further comprising:
a third storage area, coupled to said circuit, having stored therein an indication for indicating said address range is applicable to data addresses, said circuit writing said second address and transmitting said signal only if said second address is within said address range and said indication indicates said address range is applicable to data addresses.

14. A method for providing debugging information, said method comprising the computer implemented steps of:
storing a first address and a mask;
generating a second address to access data;
determining said second address is in an address range defined by said first address and said mask;
writing said second address to a register that is accessible by a debug handler; and
generating a debug event.

15. The method of claim 14, said step of determining further comprising the steps of:
masking said second address with said mask to generate a masked address; and
comparing said masked address to said first address.

16. The method of claim 15, further comprising the steps of:
storing a dynamic indication; and
determining said dynamic indication indicates said address range is a data address range.

17. The method of claim 15, further comprising the step of executing said debug handler in response to said debug event.

18. In a computer system, a method for providing information useful in debugging, said method comprising the steps of:
storing an information identifying an address range, said information capable of identifying an address range greater than 4 bytes;
generating an address to access data as a result of executing a program;
determining said address is in said address range;
writing said address to a register for use in debugging; and
causing a debug event.

19. The method of claim 18, further comprising the steps of:
storing an indication identifying said address range as a data address range; and
in response to said step of generating, determining said address range is a data address range based on said indication.

20. The method of claim 18, further comprising the step of executing a debug handler in response to said debug event.

21. A processor comprising:
- a first storage area configured to store a first address;
- a second storage area configured to store a mask, said first address and said mask defining an address range;
- a data breakpoint storage area;
- an address range breakpoint unit coupled to receive a second address generated to access either data or an instruction, said address range breakpoint unit coupled to said first storage area and said second storage area to receive said first address and said mask, said address range breakpoint unit configured to write said second address to said data breakpoint storage if each of a set of conditions is meet, said set of conditions including if said second address is within said address range and if said second address was generated to access data.

22. The processor of claim 21 further comprising:
- a third storage area, coupled to said address range breakpoint unit, having stored therein an indication for designating said address range as being applicable to addresses generated to access data, said address range breakpoint unit coupled to receive said indication, said set of conditions including if said indication is currently designating said address range as applicable to addresses generated to access data.

* * * * *

UNITED STATES PATENT AND TRADEMARK OFFICE
CERTIFICATE OF CORRECTION

PATENT NO. : 6,052,801
DATED : April 18, 2000
INVENTOR(S) : Hammond et al.

It is certified that error appears in the above-identified patent and that said Letters Patent is hereby corrected as shown below:

In column 6, at line 39, delete "aid" and insert --and--.

Signed and Sealed this

Twenty-second Day of May, 2001

Attest:

NICHOLAS P. GODICI

*Attesting Officer*     Acting Director of the United States Patent and Trademark Office